United States Patent
Beaufays et al.

(10) Patent No.: US 12,417,757 B2
(45) Date of Patent: *Sep. 16, 2025

(54) ON-DEVICE SPEECH SYNTHESIS OF TEXTUAL SEGMENTS FOR TRAINING OF ON-DEVICE SPEECH RECOGNITION MODEL

(71) Applicant: GOOGLE LLC, Mountain View, CA (US)

(72) Inventors: Françoise Beaufays, Mountain View, CA (US); Johan Schalkwyk, Scarsdale, NY (US); Khe Chai Sim, Dublin, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/656,197

(22) Filed: May 6, 2024

(65) Prior Publication Data
US 2024/0290317 A1    Aug. 29, 2024

Related U.S. Application Data

(63) Continuation of application No. 18/204,324, filed on May 31, 2023, now Pat. No. 11,978,432, which is a
(Continued)

(51) Int. Cl.
| | | |
|---|---|---|
| G10L 13/00 | (2006.01) | |
| G10L 13/047 | (2013.01) | |
| G10L 15/06 | (2013.01) | |

(52) U.S. Cl.
CPC .......... *G10L 13/047* (2013.01); *G10L 15/063* (2013.01); *G10L 2015/0635* (2013.01)

(58) Field of Classification Search
CPC ................. G10L 13/047; G10L 15/063; G10L 2015/0635; G10L 13/08; G10L 15/187;
(Continued)

(56) References Cited

U.S. PATENT DOCUMENTS

| | | | | |
|---|---|---|---|---|
| 6,970,820 B2 * | 11/2005 | Junqua | ..................... | G10L 13/04 |
| | | | | 704/266 |
| 7,277,855 B1 * | 10/2007 | Acker | ..................... | G10L 13/02 |
| | | | | 704/270.1 |

(Continued)

FOREIGN PATENT DOCUMENTS

| | | |
|---|---|---|
| CN | 108133705 | 6/2018 |
| CN | 108182936 | 6/2018 |

(Continued)

OTHER PUBLICATIONS

China National Intellectual Property Administration; Notice of Allowance issued in Application No. 201980091350.4; 4 pages; dated Jun. 18, 2024.

(Continued)

*Primary Examiner* — Abdelali Serrou
(74) *Attorney, Agent, or Firm* — Gray Ice Higdon

(57) ABSTRACT

Processor(s) of a client device can: identify a textual segment stored locally at the client device; process the textual segment, using a speech synthesis model stored locally at the client device, to generate synthesized speech audio data that includes synthesized speech of the identified textual segment; process the synthesized speech, using an on-device speech recognition model that is stored locally at the client device, to generate predicted output; and generate a gradient based on comparing the predicted output to ground truth output that corresponds to the textual segment. In some implementations, the generated gradient is used, by processor(s) of the client device, to update weights of the on-device speech recognition model. In some implementations, the (Continued)

generated gradient is additionally or alternatively transmitted to a remote system for use in remote updating of global weights of a global speech recognition model.

19 Claims, 6 Drawing Sheets

Related U.S. Application Data continuation of application No. 17/479,285, filed on Sep. 20, 2021, now Pat. No. 11,705,106, which is a continuation of application No. 16/959,546, filed as application No. PCT/US2019/054314 on Oct. 2, 2019, now Pat. No. 11,127,392.

(60) Provisional application No. 62/872,140, filed on Jul. 9, 2019.

(58) Field of Classification Search
CPC ......... G10L 15/26; G10L 13/02; G10L 13/04; G10L 13/10; G10L 2015/088; G10L 25/30; G10L 13/06; G10L 15/10; G10L 19/20; G10L 15/01; G10L 15/02; G10L 15/04; G10L 15/06; G10L 15/07; G10L 15/08; G10L 15/12; G10L 15/18; G10L 15/1807; G10L 15/1815; G10L 15/22; G10L 15/32; G10L 19/008; G10L 19/0204; G10L 19/265; G10L 2015/228; G10L 21/0388; G10L 25/75; G10L 25/90; G10L 13/07; G10L 19/18; G10L 2013/083; G06F 16/3338; G06F 16/951; G06F 17/2785; G06F 17/2795; G06F 17/30864; G06F 40/232; G06F 40/247; G06F 40/30
See application file for complete search history.

(56) References Cited

U.S. PATENT DOCUMENTS

| | | | |
|---|---|---|---|
| 7,668,718 B2 | 2/2010 | Kahn et al. | |
| 7,957,969 B2 | 6/2011 | Alewine et al. | |
| 8,818,793 B1 | 8/2014 | Bangalore | |
| 9,508,338 B1 | 11/2016 | Kaszczuk et al. | |
| 9,697,822 B1 | 7/2017 | Naik et al. | |
| 9,792,900 B1 | 10/2017 | Kaskari | |
| 9,911,437 B2* | 3/2018 | Melamed | G06F 3/162 |
| 10,388,272 B1 | 8/2019 | Thomson et al. | |
| 10,789,956 B1 | 9/2020 | Dube | |
| 11,127,392 B2 | 9/2021 | Beaufays et al. | |
| 11,705,106 B2 | 7/2023 | Beaufays et al. | |
| 2003/0069729 A1 | 4/2003 | Bickley et al. | |
| 2005/0182629 A1 | 8/2005 | Coorman et al. | |
| 2006/0136205 A1* | 6/2006 | Song | G10L 15/063 704/243 |
| 2006/0149558 A1 | 7/2006 | Kahn et al. | |
| 2007/0055526 A1 | 3/2007 | Eide et al. | |
| 2007/0208570 A1 | 9/2007 | Bhardwaj | |
| 2008/0235024 A1* | 9/2008 | Goldberg | G10L 13/00 704/260 |
| 2011/0153620 A1* | 6/2011 | Coifman | G10L 15/065 707/748 |
| 2011/0288863 A1 | 11/2011 | Rasmussen | |
| 2012/0310642 A1 | 12/2012 | Cao et al. | |
| 2013/0262096 A1 | 10/2013 | Wilhelms-Tricarico et al. | |
| 2013/0325446 A1 | 12/2013 | Levien et al. | |
| 2015/0025891 A1* | 1/2015 | Goldberg | G10L 13/033 704/260 |
| 2015/0081293 A1 | 3/2015 | Hsu et al. | |
| 2015/0161983 A1 | 6/2015 | Yassa | |
| 2016/0247521 A1* | 8/2016 | Melamed | G10L 15/30 |
| 2016/0379626 A1 | 12/2016 | Deisher et al. | |
| 2017/0069311 A1* | 3/2017 | Grost | G10L 15/26 |
| 2017/0206889 A1 | 7/2017 | Lev-Tov et al. | |
| 2017/0301347 A1 | 10/2017 | Fuhrman | |
| 2019/0005947 A1 | 1/2019 | Kim et al. | |
| 2019/0005952 A1 | 1/2019 | Kruse et al. | |
| 2020/0175961 A1* | 6/2020 | Thomson | G10L 15/28 |
| 2021/0006920 A1 | 1/2021 | Beaufays et al. | |
| 2021/0104223 A1 | 4/2021 | Beaufays et al. | |
| 2022/0005458 A1 | 1/2022 | Beaufays et al. | |
| 2022/0005462 A1 | 1/2022 | Hwang | |
| 2023/0306955 A1 | 9/2023 | Beaufays et al. | |

FOREIGN PATENT DOCUMENTS

| | | |
|---|---|---|
| CN | 109215637 | 1/2019 |
| CN | 109887484 | 6/2019 |
| JP | H0389294 | 4/1991 |
| JP | H11338489 | 12/1999 |
| JP | 2001013983 | 1/2001 |
| JP | 2005043461 | 2/2005 |
| JP | 2005301097 | 10/2005 |
| JP | 2013218095 | 10/2013 |
| JP | 2019101291 | 6/2019 |

OTHER PUBLICATIONS

Intellectual Property India; Hearing Notice issued in Application No. IN202127030140; 2 pages; dated Aug. 19, 2024.
China National Intellectual Property Administration; Notification of First Office Action issued in Application No. 201980091350.4; 15 pages; dated Jan. 9, 2024.
Japanese Patent Office; Notice of Allowance issued in Application No. 2021-541637, 3 pages, dated Jun. 13, 2022.
Intellectual Property India; Examination Report issued in Application No. IN202127030140; 6 pages; dated Mar. 14, 2022.
The Korean Intellectual Property Office; Allowance of Patent issued in Application No. 10-2021-7024199, 3 pages, dated Mar. 25, 2022.
The Korean Intellectual Property Office; Notice of Office Action issued in Application No. 10-2021-7024199; 10 pages; dated Dec. 15, 2021.
Ueno, S. et al. , "Multi-Speaker Sequence-to-Sequence Speech Synthesis for Data Augmentation in Acoustic-to-Word Speech Recognition;" 2019 IEEE International Conference on Acoustics, Speech and Signal Processing; pp. 6161-6165; May 12, 2019.
European Patent Office; International Search Report and Written Opinion of PCT Ser. No. PCT/US2019/054314; 17 pages; dated Feb. 21, 2020.

* cited by examiner

ON-DEVICE SPEECH SYNTHESIS OF TEXTUAL SEGMENTS FOR TRAINING OF ON-DEVICE SPEECH RECOGNITION MODEL

BACKGROUND

Voice-based user interfaces are increasingly being used in the control of computers and other electronic devices. Voice-based user interfaces have continued to evolve from early rudimentary interfaces that could only understand simple and direct commands to more sophisticated interfaces that respond to natural language requests and that can understand context and manage back-and-forth dialogs or conversations with users. Many voice-based user interfaces perform speech recognition (e.g., using a speech-to-text model) on a spoken utterance to generate corresponding text, perform a semantic analysis of the text in an attempt to determine the meaning of the spoken utterance, and undertake one or more actions based on the determined meaning.

While speech recognition performance has continued to improve, inaccurate speech recognition can still occur for many situations. As a non-limiting example, inaccurate speech recognition can occur for new terms and/or for terms that are relatively infrequent (or non-existent) in a training corpus on which a speech recognition model is trained. In an attempt to effectively recognize new terms and/or infrequent terms, techniques have been proposed to generate additional speech recognition hypotheses that are in addition to an initial hypothesis (or initial hypotheses), and consider the additional speech recognition hypotheses as candidates for speech recognition. However, such techniques require additional post-processing, and can still fail to lead to effective recognition of many terms in many situations, such as when the initial hypothesis/hypotheses are too far off-base and/or when a lexicon for the additional hypotheses does not include certain terms.

Moreover, inaccurate speech recognition can be exacerbated when speech recognition is performed on-device (i.e., on a client device). This can be due to, for example, an on-device speech recognition model being less robust than a cloud-based model, on-device memory and/or processor resources being more constrained than cloud-based resources, and/or additional hypotheses generation lexicons being more constrained on device.

SUMMARY

Some implementations disclosed herein are directed to improving performance of speech recognition that is performed locally, at a client device, utilizing an on-device speech recognition model (referred to herein as "on-device speech recognition"). In those implementations, processor(s) of a client device: identify a textual segment stored locally at the client device (e.g., in RAM and/or ROM of the client device); process the textual segment, using a speech synthesis model stored locally at the client device, to generate synthesized speech audio data that includes synthesized speech of the identified textual segment; process the synthesized speech, using an on-device speech recognition model that is stored locally at the client device, to generate predicted output; and generate a gradient based on comparing the predicted output to ground truth output that corresponds to the textual segment. For example, the on-device speech recognition model can be an end-to-end speech recognition model that is used to generate predicted output of a predicted textual segment, and generating the gradient can be based on comparing the predicted textual segment to the textual segment. Also, for example, the on-device speech recognition model can instead be used to generate predicted output of a sequence of predicted phonemes, and generating the gradient can be based on comparing the sequence of predicted phonemes to a ground truth sequence of phonemes that corresponds to the textual segment.

In some implementations, the generated gradient is used, by one or more processor(s) of the client device, to update one or more weights of the on-device speech recognition model based on the generated gradient. For example, backpropagation and/or other technique(s) can be used to update the weights based on the gradient. This can improve speech recognition performance, at the client device using the on-device speech recognition model, for spoken utterances that include the textual segment. Moreover, this enables the on-device speech recognition model to be trained based on a particular textual segment, without requiring any actual human utterances of the particular textual segment. Thus, the particular textual segment can be correctly recognized using the on-device speech recognition model, despite the textual segment potentially not having been included in any spoken utterance previously detected at the client device. Further, many implementations repeat this process for a large quantity of textual segments stored locally at the client device, thereby improving on-device speech recognition performance for spoken utterances that include any of the textual segments. This effectively tailors the on-device speech recognition model to actual textual segments that are stored (transiently or non-transiently) on the device, and that are likely to be included in spoken utterances directed to the client device.

In some implementations, the on-device speech recognition model that is updated based on generated gradient(s) can be in addition to an on-device speech recognition model that is currently being utilized, by the client device, in performing speech recognition of spoken utterances detected at the client device. In those implementations, the on-device speech recognition model that is updated can, in response to one or more conditions being satisfied, be deployed to effectively replace the on-device speech recognition model that is currently being utilized (thereby becoming the on-device speech recognition model that is currently being utilized). For example, the condition(s) can include: on-device validation of the on-device speech recognition model that is updated; on-device determination that the on-device speech recognition model that is updated performs better (e.g., with respect to precision and/or recall) than the on-device speech recognition model currently being utilized; and/or occurrence of at least a threshold quantity and/or duration of training of the on-device speech recognition model that is updated. Determining that the on-device speech recognition model that is updated performs better than the on-device speech recognition model currently being utilized can be based on, for example, comparing performances based on training instance(s) that are generated according to techniques described herein, but that have not been utilized in training (i.e., instead held back for testing). Deploying a currently utilized on-device speech recognition model to effectively replace an updated on-device speech recognition model can include updating weights of the currently utilized model with weights of the updated model, or replacing the currently utilized model with the updated model. Once an updated model effectively replaces a currently utilized model and is used for speech recognition, a copy of the updated model can then be used as the new model to be updated.

In some implementations, the generated gradient is additionally or alternatively transmitted, by the client device and over a network, to a remote system. In those implementations, the remote system utilizes the generated gradient, and additional gradients from additional client devices, to update global weights of a global speech recognition model. The additional gradients from the additional client devices can be similarly generated, locally at the corresponding additional client devices, based on corresponding locally stored textual segments and locally generated synthesized speech thereof. In various implementations, the client device transmits the generated gradient without transmitting any of: the textual segment, the synthesized speech audio data, and the predicted textual segment. The remote system can utilize the generated gradient in updating the global model, without any reference to or use of the textual segment, the synthesized speech audio data, and the predicted textual segment. The transmitting of only the gradient utilizes less network resources than transmitting of the larger data size combination of the textual segment, the synthesized speech audio data, and the predicted textual segment. Further, transmitting of the gradient preserves privacy and security of the on-device textual segment, as the textual segments and the synthesized speech audio data are not derivable from the gradient. In some implementations, one or more differential privacy techniques (e.g., adding gaussian noise) can be utilized to further ensure the textual segments and/or the synthesized speech audio data are not derivable from the gradient.

In implementations where the remote system updates global weights of the speech recognition model, the remote system can thereafter provide the updated global weights to client devices to cause the client devices to replace weights of their on-device speech recognition models with the updated global weights. In some implementations, the remote system can additionally or alternatively provide the updated global speech recognition model to client devices to cause the client devices to replace their on-device speech recognition models with the updated global speech recognition model. On-device speech recognition performance is therefore improved through utilization of the updated global weights or updated global speech recognition model.

Various techniques can be utilized by a client device to identify locally stored textual segment(s) for utilization in generating gradients based on the textual segment(s) and corresponding locally generated synthesized speech.

For example, the textual segment(s) can be identified based on them being included in a contacts list, a media playlist, a list of aliases of linked smart devices (e.g., aliases of smart lights, smart plugs, and/or other smart devices linked with an account of the client device), and/or from typed input received at the client device. For instance, a textual segment can be identified based on determining that is an alias for a newly added contact of a contacts list, or that it is an alias for a newly added smart device. In these and other manners, on-device speech recognition can be quickly improved for newly added aliases, enabling correct recognition of voice-based interactions directed to corresponding contacts and/or corresponding smart devices. Also, for instance, one or more textual segments can be identified based on typed user interface input that includes those textual segment(s), such as typed user interface input directed at an interface provided for enabling a user to provide a listing of textual segments that are important to the user.

As another example, the textual segment(s) can additionally or alternatively be identified based on determining that the textual segment(s) are out of vocabulary (i.e., textual segment(s) on which the on-device speech recognition model has not been previously trained). Determining that the textual segment(s) are out of vocabulary can be based on determining that they are not included in a locally stored lexicon and/or based on other considerations.

As yet another example, a textual segment can be identified based on determining that a prior human utterance, detected via one or more microphones of the client device, included the textual segment and determining that a prior speech recognition of the prior human utterance, performed using the on-device speech recognition model, failed to correctly recognize the textual segment. Determining that the prior speech recognition failed to correctly recognize the textual segment can be based on received user input that cancels an incorrect prediction that is based on the prior speech recognition. Further, determining that the prior human utterance included the textual segment can be based on the received user input and/or based on additional received user input that is received after the user input that cancels the incorrect prediction based on the prior speech recognition. For example, the incorrect prediction can be a rendered transcription of a spoken utterance, and the received user input that cancels the incorrect prediction can be a modification of all or portions of the rendered transcription. For instance, an incorrect transcription of "François" can be rendered, the received user input that cancels the incorrect prediction can be user interface input that adds an "e" at the end of the name (correcting it to "Françoise"), and determining that the spoken utterance included "Françoise" can be based on the user interface input that added the "e" at the end of the name. Also, for instance, the incorrect transcription of "Francis" can be rendered, the received user input that cancels the incorrect prediction can be user interface input that deletes the incorrect transcription, and determining that the spoken utterance included "Françoise" can be based on additional typed user interface input of "Françoise" in place of the deleted transcription of "Francis". As another example, multiple candidate transcriptions can be generated and rendered along with a prompt for the user to select the correct transcription (e.g., "did you mean (1) François, (2) Françoise, or (3) Francis"), and the selection of the correct candidate transcription (e.g., tapping on "(3) Francis" or speaking "3") can cancel the incorrect transcription(s) (e.g., "François" and "Francis") and indicate the correct transcription (e.g., "Françoise"). As another example, the incorrect prediction can be an action to be performed, the received user input that cancels the incorrect prediction can be a cancellation of the action prior to or during performance, and the additional received user input can include input of the textual segment.

To conserve limited battery, processor, memory, and/or other resources of a client device, in various implementations a client device performs one or more steps disclosed herein only responsive to determining a current state of the client device satisfies one or more conditions. For example, generating the synthesized speech audio data, and/or processing the synthesized speech audio data to generate the predicted textual segment, and/or generating the gradient, and/or updating the one or more weights can be performed responsive to determining that the current state of the client device satisfies the one or more conditions. Whether the one or more conditions are satisfied can be determined based on sensor data from one or more sensors of the client device. The one or more conditions can include, for example, that the client device is charging, that the client device has at least a threshold state of charge, that a temperature of the client device (based on one or more on-device temperature sensors) is less than a threshold, and/or that the client device is not being held by a user.

In some implementations, synthesized speech audio data can be generated that includes synthesized speech of the identified textual segment, as well as additional textual segment(s). For example, the additional textual segment(s) can be appended before and/or after the textual segment, and the textual segment with the appended additional textual segment(s) processed using the speech synthesis model to generate the synthesized speech. In some of those implementations, determining an additional textual segment for a textual segment is based on a defined relationship of the additional textual segment to a particular corpus from which the textual segment is identified. For example, additional textual segments of "call", "message", and "contact" can have a defined relationship to a contacts list corpus. As another example, additional textual segments of "turn on the", "what's the status of", and "adjust" can have a defined relationship to a smart devices corpus in general, or to a corpus of specific smart devices. Including the additional textual segment can result in diversity of training instances, which can improve performance of the speech recognition model. Further, where an additional textual segment is determined based on a defined relationship and/or other contextual relevance to a textual segment, training instances based on such additional textual segment can improve speech recognition performance when the textual segment is included in an utterance with the additional textual segment or similar additional textual segment.

In some implementations, synthesized speech audio data is generated in a manner that is adapted to speech characteristics of a user of the client device. This can result in improved on-device speech recognition performance that is tailored to those speech characteristics that are more likely to be encountered in spoken utterances processed at the client device. In some of those implementations, the synthesized speech audio data is adapted to speech characteristics of the user based on being generated using a particular locally stored speech synthesis model. The particular locally stored speech synthesis model can be one of a plurality of candidate speech synthesis models for a given language, and can be locally stored at the client device based at least in part on a geographic region of the client device.

In some additional or alternative implementations, the speech synthesis model is actually trained based on prior utterances of the user of the client device, making the synthesized speech more accurately reflect speech characteristic(s) of the user (e.g., accent of the user). For example, prior to generating the synthesized speech audio data, audio data can be identified that is detected via one or more microphones of the client device and that captures a prior human utterance. Further, a ground truth transcription for the prior human utterance can be identified. Yet further, the ground truth transcription can be processed using the speech synthesis model to generate prior synthesized speech audio data, a gradient generated based on comparing the prior synthesized speech audio data to the prior audio data, and one or more weights of the speech synthesis model based on the gradient. Identifying the ground truth transcription for the prior human utterance can include generating a transcription using the speech recognition model, and identifying the transcription as the ground truth transcription based on a confidence measure in generating the transcription and/or based on a user action performed responsive to the transcription. The user action can include, for example, user interface input that confirms the transcription. For instance, the transcription can be incorporated in an electronic message to be sent, and the user action can include user input to send the message (without modifying the generated transcription).

In some additional or alternative implementations, the speech synthesis model (or multiple speech synthesis models) can be used to generate multiple disparate instances of synthesized speech for a given textual segment. For example, for a textual segment that is a German name, the speech synthesis model(s) can be utilized to generate a first instance of synthesized speech that is an English pronunciation of the German name (i.e., a pronunciation that would be utilized by a native English speaker that does not speak German) and to generate a second instance of synthesized speech that is a German pronunciation of the German name (i.e., a pronunciation that would be utilized by a native German speaker). The first instance of the synthesized speech and the ground truth spoken utterance can be utilized in updating the on-device speech recognition model. The second instance of the synthesized speech and the ground truth spoken utterance can also be utilized in updating the on-device speech recognition model. Updating the on-device speech recognition model based on both instances of synthesized speech can enable effective speech recognition for either of the pronunciations. This can be beneficial, for example, where voice characteristic(s) of a user are unknown, enabling adaptation of the on-device speech recognition model to recognize the German name when it is spoken with any of multiple different pronunciations.

As described herein, after updating of an on-device speech recognition model according to implementations disclosed herein, the on-device speech recognition model can be utilized in processing audio data corresponding to spoken utterances, from user(s) of the corresponding device, to generate corresponding predicted textual segments. In some versions of those implementations, a gradient can be generated, on-device, based on comparing an instance of a predicted textual segment to an instance of a ground truth textual segment. The instance of the ground truth textual segment can be determined, on-device, based on one or more action(s) and/or inaction(s) of the user responsive to content rendered at the device based on the instance of the predicted textual segment and/or based on action(s) taken at the device based on the instance of the predicted textual segment. For example, if the user confirms the predicted textual segment, the predicted textual segment can be considered the ground truth textual segment. For instance, if the spoken utterance is "call Francis", and the predicted textual segment is "call Francis", the user can confirm the predicted textual segment by not cancelling a resulting dialing of a phone number for a contact named "Francis". Also, for instance, if the spoken utterance is "call Francis", the predicted textual segment is "call Francis", a prompt of "do you want to call Francis" can be provided with a selectable "yes" option, and the user can confirm the recognized text by selecting the "yes" option. As another example, if the user modifies the predicted textual segment (e.g., by adding and/or deleting character(s); and/or by deleting it and replacing it with alternate text), the modified text can be considered the ground truth textual segment. For instance, if the spoken utterance of "Hi Françoise, please call me soon" is provided for inclusion in a text message, and the incorrectly recognized text of "Hi Francis, please call me soon" is incorporated into the text message, the user can select "Francis" and replace it with "Françoise". Responsive to the user selecting "Francis" and replacing it with "Françoise", the modified text of "Hi Françoise, please call me soon" can be utilized as the ground truth textual segment. Gradient(s) generated based on these techniques can be transmitted, by the client device and over a network, to a remote system. In those implementations, the remote system utilizes the generated gradient(s), and additional gradients generated from additional client devices in a similar manner (e.g., after local updating of an on-device speech recognition model and based on comparing a predicted textual segment to a determined ground truth textual segment), to update global weights of a global speech recognition model. It is noted that the updating of the global weights based on such gradients can occur along with, or independent of, updating of the global weights based on gradients that are based on locally stored textual segments and locally generated synthesized speech thereof (as described earlier). It is also noted that transmitting such gradients can occur without transmitting any of: the audio data corresponding to the spoken segment or the ground truth textual segment. The remote system can utilize the generated gradient in updating the global model, without any reference to or use of the audio data corresponding to the spoken segment or the ground truth textual segment. The transmitting of only the gradient utilizes less network resources, and preserves privacy and security of the on-device textual segment. In some implementations, one or more differential privacy techniques can be utilized to further ensure preservation of the privacy and security.

In some implementations, after updating of an on-device speech recognition model according to implementations disclosed herein, biasing of the on-device speech recognition based on textual segment(s) can also be utilized, when the on-device speech recognition model is processing audio data corresponding to spoken utterances to generate corresponding predicted textual segments. For example, the on-device speech recognition can be biased toward one or more textual segments stored on the device, such as contact alias(es), road name(s), media name(s), and/or other textual segment(s). The textual segment(s) to which on-device speech recognition is biased can be the same across multiple iterations of speech recognition and/or can vary amongst iterations. For example, biasing toward a first textual segments can occur in first device context(s) (e.g., context(s) based on which application(s) are executing or in the foreground, based on time of day, based on day of week, etc.) and biasing toward disparate second textual segments can occur in second device context(s). Biasing the on-device speech recognition to textual segment(s) can include, for example, injecting the textual segment(s) into the speech recognition by boosting the probability of the textual segment(s) during decoding. Biasing the on-device speech recognition based on textual segment(s) after updating of the on-device speech recognition model according to implementations disclosed herein can be more effective than biasing without such updating. This can be due to, for example, the on-device speech recognition model having been trained on sound sequences from the textual segment(s) as a result of having been updated based on synthesized speech that is based on the textual segment(s).

Some implementations of client devices disclosed herein include an automated assistant application that generates the on-device speech recognitions and/or that utilizes generated on-device speech recognitions. The automated assistant application can be installed "on-top of" an operating system of the client device and/or can itself form part of (or the entirety of) the operating system of the client device. The automated assistant application includes, and/or has access to, the on-device speech recognition as well as optionally on-device natural language understanding and/or on-device fulfillment. On-device natural language understanding (NLU) can be performed using an on-device NLU module that processes recognized text, generated using the on-device speech recognition, and optionally contextual data, to generate NLU data. NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to Internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

The above description is provided as an overview of some implementations of the present disclosure. Further description of those implementations, and other implementations, are described in more detail below.

Some implementations disclosed herein include one or more computing devices that include one or more processors such as central processing unit(s) (CPU(s)), graphics processing unit(s) (GPU(s)), digital signal processor(s) (DSP(s)), and/or tensor processing unit(s) (TPU(s)). One or more of the processors are operable to execute instructions stored in associated memory, and the instructions are configured to cause performance of any of the methods described herein. The computing devices can include, for example, client assistant devices with microphone(s), at least one display, and/or other sensor component(s). Some implementations also include one or more non-transitory computer readable storage media storing computer instructions executable by one or more processors to perform any of the methods described herein.

DETAILED DESCRIPTION

Figure 1A:
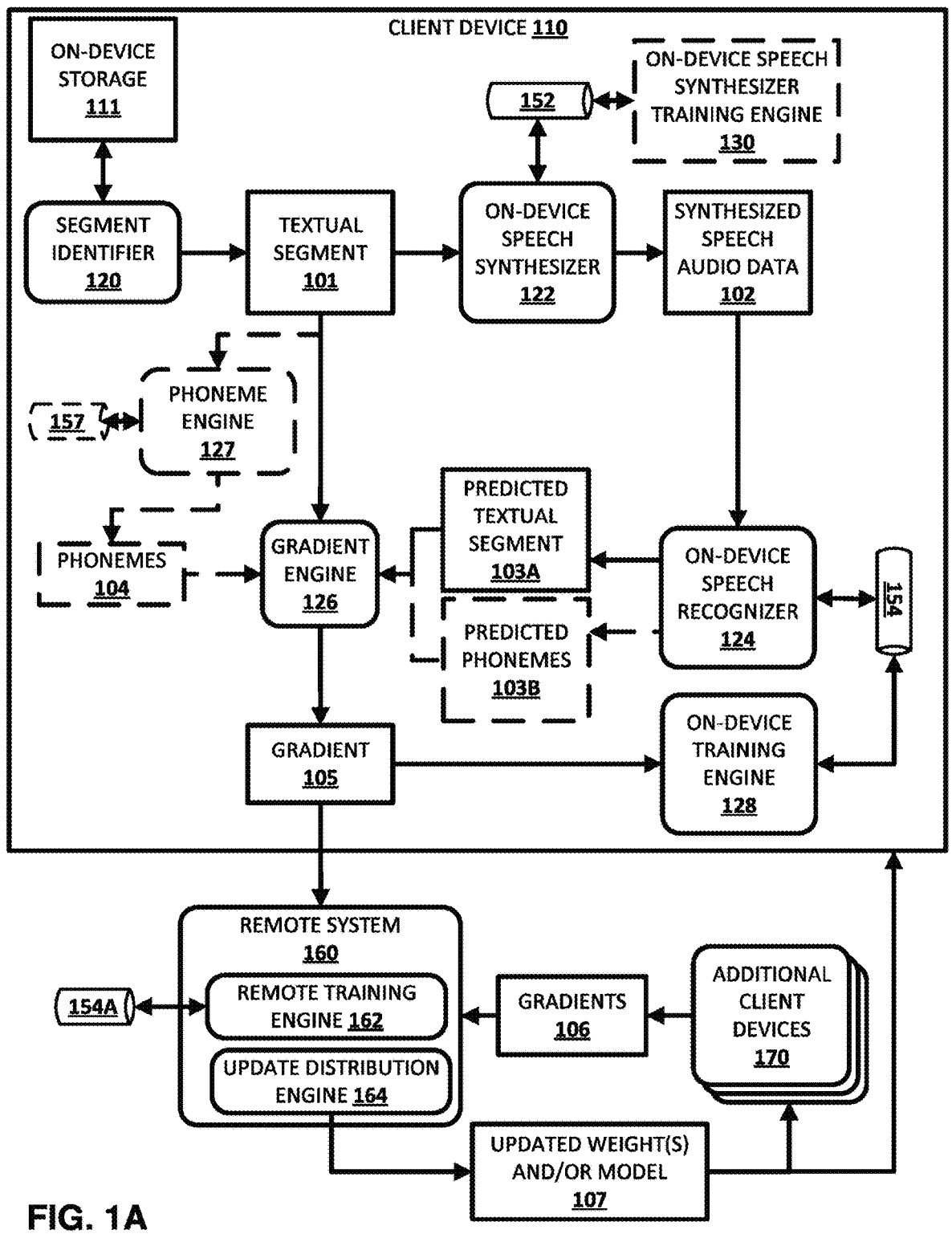
FIG. 1A depicts an example process flow that demonstrates various aspects of the present disclosure, in accordance with various implementations.

FIG. 1A illustrates an example process flow that demonstrates various aspects of the present disclosure. A client device 110 is illustrated in FIG. 1A, and includes the components that are encompassed within the box of FIG. 1A that represents client device 110. A segment identifier 120 of the client device 110 accesses on-device storage 111 to identify a textual segment 101. The on-device storage 110 can include, for example, read-only memory (ROM) and/or random-access memory (RAM). The textual segment 101 identified by the segment identifier 120 is a textual segment that is transiently or non-transiently stored in on-device storage 111. For example, the textual segment 101 can be: an alias of a contact that is stored in a contacts list; a name of a road that is stored as an address in a contacts list; a name of a song or other media item that is included in a playlist of a media application; an alias of a smart device, where the alias is stored at the client device and the smart device is associated with an account of the user; a textual segment typed via a virtual keyboard at the client device; a textual segment copied to a pasteboard at the client device; a textual segment rendered by an application of the computing device (and optionally identified using a screenshot and image recognition); or other textual segment.

In some implementations, the segment identifier 120 identifies the textual segment 101 based on it being newly encountered or newly stored at the client device 110. For example, the segment identifier 120 can identify the textual segment 101 based on it being included in a newly added contact, being an alias for a newly added smart device, or being an alias for a newly added song to a playlist. In some implementations, the segment identifier 120 identifies the textual segment 101 based on determining that the textual segment 101 is out of vocabulary, which can be based on determining that the textual segment 101 is not included in a locally stored lexicon.

In some implementations, the segment identifier 120 can identify the textual segment 101 based on determining that a prior human utterance, detected via one or more microphones of the client device 110, included the textual segment 101 and determining that a prior speech recognition of the prior human utterance failed to correctly recognize the textual segment. In those implementations, the segment identifier 120 can determine that the prior speech recognition failed to correctly recognize the textual segment based on received user input, at the client device 110, that cancels an incorrect prediction that is based on the prior speech recognition. Further, the segment identifier 120 can determine that the prior human utterance included the textual segment 101 based on additional received user input, that is received after the user input that cancels the incorrect prediction based on the prior speech recognition.

The segment identifier 120 provides at least the textual segment 101 to an on-device speech synthesizer 122. In some implementations, the segment identifier 120 provides the identified textual segment, as well as additional textual segment(s), to the on-device speech synthesizer 122. For example, the segment identifier 120 can append the additional textual segment(s) before and/or after the textual segment, and provide the textual segment 101 with appended additional textual segment(s) to the on-device speech synthesizer 122. In some of those implementations, the segment identifier 120 determines the additional textual segment for the textual segment 101 based on a defined relationship of the additional textual segment to a particular corpus from which the textual segment 101 was identified. For example, if textual segment 101 is identified from a media corpus, additional textual segments of "play" and "show me" can have a defined relationship to the media corpus, and one of those additional textual segments can be appended before the textual segment.

The on-device speech synthesizer 122 processes the textual segment 101 (and any appended additional textual segment(s)), using an on-device speech synthesis model 152, to generate synthesized speech audio data 102 that includes synthesized speech of the identified textual segment 101. For example, the on-device speech synthesizer 122 can determine a sequence of phonemes determined to correspond to the textual segment 101 (and any appended additional textual segment(s)) and process the sequence of phonemes using the on-device speech synthesis model 152, to generate synthesized speech audio data 102. The synthesized speech audio data 102 can be, for example, in the form of an audio waveform. In determining a sequence of phonemes that correspond to the textual segment 101, the on-device speech synthesizer 122 can access a tokens-to-phonemes mapping stored locally at the client device 110, such as optional token-to-phonemes mapping 157.

In some implementations, the on-device speech synthesis model 152 is transmitted (e.g., by the remote system 160 or other component) for storage and use at the client device 110, based on a geographic region and/or other properties of the client device 100 and/or a user of the client device 110. For example, the on-device speech synthesis model 152 can be one of N available speech synthesis models for a given language, but can be trained based on spoken utterances that are specific to a particular geographic region and provided to client device 110 based on client device being primarily located in the particular geographic region.

In some additional or alternative implementations, the on-device speech synthesis model 152 is trained by the optional on-device speech synthesizer training engine 130 to adapt the on-device speech synthesis model 152 to voice characteristic(s) of user(s) of the client device 110. For example, prior to generating the synthesized speech audio data 102, the on-device speech synthesizer training engine 130 can identify audio data that is detected via one or more microphones of the client device 110 and that captures a prior human utterance. Further, the on-device speech synthesizer training engine 130 can identify a ground truth transcription for the prior human utterance. Yet further, the on-device speech synthesizer training engine 130 can process the ground truth transcription using the on-device speech synthesis model 152 to generate prior synthesized speech audio data, and can generate a gradient based on comparing the prior synthesized speech audio data to the prior audio data. The on-device speech synthesizer training engine 130 can then update weight(s) of the on-device speech synthesis model 152 based on the gradient (e.g., using backpropagation and/or other training technique(s)).

In some implementations, on-device speech synthesizer training engine 130 identifies the ground truth transcription for the prior human utterance by generating a transcription (e.g., by processing the corresponding audio data using the on-device speech recognition model 154), and identifies the transcription as the ground truth transcription. Identifying the transcription as "ground truth" can optionally be contingent on a confidence measure for the transcription satisfying a threshold and/or based on user action(s) (or inactions), responsive to the transcription, indicating the transcription is correct. In some implementations, the prior human utterance can be an enrollment phrase spoken by the user for text-independent or text-dependent identification, and the enrollment phrase can be rendered to the user to inform the user what to speak during the enrollment. In those implementations, the enrollment phrase rendered to the user can be utilized as the ground truth transcription.

The on-device speech synthesizer 122 provides the synthesized speech audio data 102 to the on-device speech recognizer 124. The on-device speech recognizer 124 processes the synthesized speech audio data 102, using an on-device speech recognition model 154, to generate either a predicted textual segment 103A or a predicted sequence of phonemes 103B.

For example, when the on-device speech recognition model 154 is an end-to-end speech recognition model, the on-device speech recognizer 124 can generate the predicted textual segment 103A directly using the model. For instance, the on-device speech recognition model 154 can be an end-to-end model used to generate predicted text on a character-by-character basis (or other token-by-token basis). One non-limiting example of such an end-to-end model used to generate predicted text on a character-by-character basis is a recurrent neural network transducer (RNN-T) model. An RNN-T model is a form of sequence-to-sequence model that does not employ attention mechanisms. Unlike most sequence-to-sequence models, which typically need to process the entire input sequence (e.g., an audio data waveform, or mel-frequency cepstral coefficients (MFCCs) or other representation) to produce an output (e.g., the predicted textual segment), an RNN-T model can be used to continuously process input samples and stream output symbols (e.g., characters of the alphabet).

Also, for example, when the on-device speech recognition model 154 is not an end-to-end speech recognition model, the on-device speech recognizer 124 can instead generate predicted phonemes 103B (and/or other representations). For instance, with such models the predicted phonemes 103B (and/or other representations) are then utilized by the on-device speech recognizer 124 to determine predicted textual segment(s) that conform to the sequence of phonemes. In doing so, the on-device speech recognizer 124 can optionally employ a decoding graph, a lexicon, and/or other resource(s).

When the on-device speech recognizer 124 generates the predicted textual segment 103A, it is provided to gradient engine 126. Gradient engine 126 compares the predicted textual segment 103A to the textual segment 101 to generate a gradient 105. The gradient may be derived from a loss function used to train the model, such that the gradient represents a value of that loss function (or a derivative thereof) obtained from comparison of the ground truth output to the predicted output. For example, when the predicted textual segment 103A and the textual segment 101 match, the gradient engine 126 can generate a zero gradient. Also, for example, when the predicted textual segment 103A and the textual segment 101 do not match, the gradient engine 126 can generate a non-zero gradient that is optionally dependent on the extent of the mismatching. The extent of the mismatching can be based on an extent of mismatching between characters of the textual segments, an extent of phoneme mismatching between the textual segments, and/or based on other deterministic comparisons. As one non-limiting particular example, at each iteration of generating the predicted textual segment 103A, the on-device speech recognizer 124 can generate a corresponding probability for each of a plurality of characters, and select the highest probability character as the "next" character. The gradient engine 126 can, in such an example, determine a gradient based on comparing the predicted probabilities at each iteration to ground truth probabilities for each iteration (i.e., where the ground truth character at each iteration is the "next" character in the textual segment 101 and is assigned a "1" probability, and all others a "0" probability).

When the on-device speech recognizer 124 generates the predicted phonemes 103B, they are provided to gradient engine 126. Gradient engine 126 compares the predicted phonemes 103B to ground truth sequence of phonemes 104 determined to correspond to the textual segment 101. In some implementations, phoneme engine 127 can access tokens-to-phonemes mapping 157 to determine the ground truth sequence of phonemes 104 that correspond to the textual segment 101. As an example, when the predicted phonemes 103B and the phonemes 104 match, the gradient engine 126 can generate a zero gradient. As another example, when the predicted phonemes 103B and the phonemes 104 do not match, the gradient engine 126 can generate a non-zero gradient that is optionally dependent on the extent of the mismatching. The extent of the mismatching can be based on a quantity of mismatched phonemes, a quantity of incorrectly ordered phonemes, and/or a distance (in phoneme space) between mismatched phoneme(s), and/or based on other deterministic comparisons.

It is noted that in implementations where an additional textual segment is appended to the textual segment as described herein, the predicted textual segment 103A will also include a prediction of the appended additional textual segment. The prediction of the appended additional segment can be ignored in generating the gradient (e.g., term(s) discarded that correspond to the appended additional segment) or, alternatively, the appended additional segment can be considered in generating the gradient (e.g., the prediction can be compared to the textual segment with the appended additional textual segment).

The gradient engine 126 provides the gradient 105 to on-device training engine 128 and/or transmits the gradient 105 to remote system 105. The on-device training engine 128, when it receives the gradient 105, uses the gradient 105 to update the on-device speech recognition model 154. For example, the on-device training engine 128 can utilize backpropagation and/or other techniques to update the on-device speech recognition model 154. It is noted that, in some implementations, the on-device training engine 128 can utilize batch techniques to update the on-device speech recognition model 154 based on the gradient 105 and additional gradients determined locally at the client device 110 on the basis of additional textual segments.

When the remote system 160 receives the gradient 105, a remote training engine 162 of the remote system uses the gradient 105, and additional gradients 106 from additional client devices 170, to update global weights of a global speech recognition model 154A. The additional gradients 106 from the additional client devices 170 can each be generated based on the same or similar technique as described above with respect to gradient 105 (but on the basis of locally identified textual segments 101 that are particular to those client devices).

An update distribution engine 164 can, responsive to one or more conditions being satisfied, provide, to client device 110 and/or other client device(s), the updated global weights and/or the updated global speech recognition model itself, as indicated by 107. The one or more conditions can include, for example, a threshold duration and/or quantity of training since updated weights and/or an updated speech recognition model was last provided. The one or more conditions can additionally or alternatively include, for example, a measured improvement to the updated speech recognition model and/or passage of a threshold duration of time since updated weights and/or an updated speech recognition model was last provided. When the updated weights are provided to the client device 110, the client device 110 can replace weights, of the on-device speech recognition model 154, with the updated weights. When the updated global speech recognition model is provided to the client device 110, the client device 110 can replace the on-device speech recognition model 154 with the updated global speech recognition model.

Figure 1B:
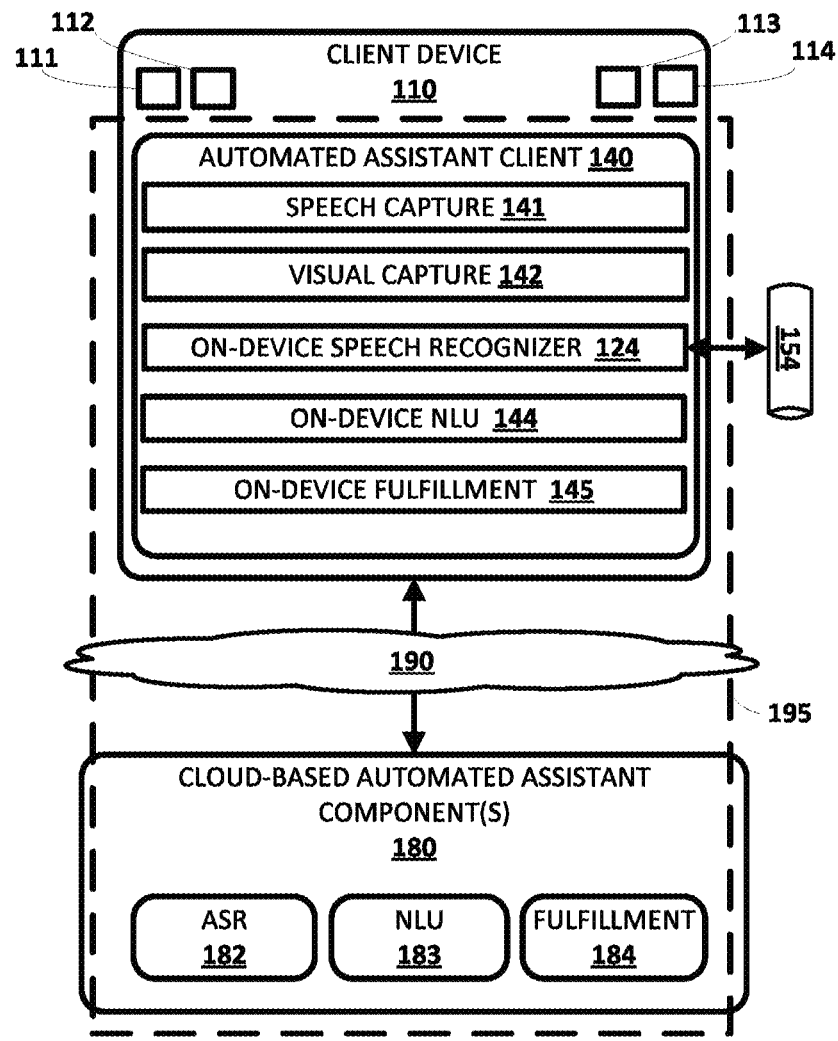
FIG. 1B is a block diagram of an example environment that includes various components from FIG. 1A, and in which implementations disclosed herein may be implemented.

Turning now to FIG. 1B, the client device 110 is illustrated in an implementation where the on-device speech recognizer 124 of FIG. 1A is included as part of (or in communication with) an automated assistant client 140. The on-device speech recognition model 154 is also illustrated interfacing with the on-device speech recognizer 124. Other components from FIG. 1A are not illustrated in FIG. 1B for simplicity. FIG. 1B illustrates one example of how the on-device speech recognizer 124 and on-device speech recognition model 154 can be utilized in generating recognized text that is utilized by an automated assistant client 140 in performing various actions.

The client device 110 in FIG. 1B is illustrated with one or more microphones 111, one or more speakers 112, one or more camera(s) and/or other vision components 113, and display(s) 114 (e.g., a touch-sensitive display). The client device 110 at least selectively executes the automated assistant client 140. The automated assistant client 140 includes, in the example of FIG. 1B, the on-device speech recognizer engine 124, an on-device natural language understanding (NLU) engine 144, and an on-device fulfillment engine 145. The automated assistant client 140 further includes speech capture engine 141 and visual capture engine 142. The automated assistant client 140 can include additional and/or alternative engines, such as a voice activity detector (VAD), an endpoint detector, a hotword detector, and/or other engine(s).

One or more cloud-based automated assistant components 180 can optionally be implemented on one or more computing systems (collectively referred to as a "cloud" computing system) that are communicatively coupled to client device 110 via one or more local and/or wide area networks (e.g., the Internet) indicated generally at 190. The cloud-based automated assistant components 180 can be implemented, for example, via a cluster of high-performance servers.

In various implementations, an instance of an automated assistant client 140, by way of its interactions with one or more cloud-based automated assistant components 180, may form what appears to be, from a user's perspective, a logical instance of an automated assistant 195 with which the user may engage in a human-to-computer interactions (e.g., spoken interactions, gesture-based interactions, and/or touch-based interactions).

The client device 110 can be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client devices may be provided.

The vision component(s) 113 can take various forms, such as monographic cameras, stereographic cameras, a LIDAR component (or other laser-based component(s)), a radar component, etc. The one or more vision components 113 may be used, e.g., by visual capture engine 142, to capture vision frames (e.g., image frames, laser-based vision frames) of an environment in which client device 110 is deployed. In some implementations, such vision frame(s) can be utilized to determine whether a user is present near the client device 110 and/or a distance of the user (e.g., the user's face) relative to the client device. Such determination(s) can be utilized, for example, in determining whether to activate on-device speech recognizer 124.

Speech capture engine 141 can be configured to capture user's speech and/or other audio data captured via microphone(s) 111. As described herein, such audio data can be utilized (optionally after pre-processing) by on-device speech recognizer 124. For example, on-device speech recognizer 124 can process audio data that captures a spoken utterance, utilizing on-device speech recognition model 154, to generate recognized text that corresponds to the spoken utterance. On-device NLU engine 140 performs on-device natural language understanding on the recognized text to generate NLU data. NLU engine 144 can optionally utilize one or more on-device NLU models (not illustrated in FIG. 1B for simplicity) in generating the NLU data. NLU data can include, for example, intent(s) that correspond to the spoken utterance and optionally parameter(s) (e.g., slot values) for the intent(s). Further, on-device fulfillment engine 145 generates fulfillment data using the NLU data. On-device fulfillment engine 145 can optionally utilize one or more on-device fulfillment models (not illustrated in FIG. 1B for simplicity) in generating the fulfillment data. This fulfillment data can define local and/or remote responses (e.g., answers) to the spoken utterance, interaction(s) to perform with locally installed application(s) based on the spoken utterance, command(s) to transmit to Internet-of-things (IoT) device(s) (directly or via corresponding remote system(s)) based on the spoken utterance, and/or other resolution action(s) to perform based on the spoken utterance. The fulfillment data is then provided for local and/or remote performance/execution of the determined action(s) to resolve the spoken utterance. Execution can include, for example, rendering local and/or remote responses (e.g., visually and/or audibly rendering (optionally utilizing a local text-to-speech module)), interacting with locally installed applications, transmitting command(s) to IoT device(s), and/or other action(s).

Display(s) 114 can be utilized to render streaming text transcriptions from the on-device speech recognizer 124. Display(s) 114 can further be one of the user interface output component(s) through which visual portion(s) of a response, from automated assistant client 140, is rendered.

In some implementations, cloud-based automated assistant component(s) 180 can include a remote ASR engine 182 that performs speech recognition, a remote NLU engine 183 that performs natural language understanding, and/or a remote fulfillment engine 184 that generates fulfillment. A remote execution module can also optionally be included that performs remote execution based on local or remotely determined fulfillment data. Additional and/or alternative remote engines can be included. As described herein, in various implementations on-device speech processing, on-device NLU, on-device fulfillment, and/or on-device execution can be prioritized at least due to the latency and/or network usage reductions they provide when resolving a spoken utterance (due to no client-server roundtrip(s) being needed to resolve the spoken utterance). However, one or more cloud-based automated assistant component(s) 180 can be utilized at least selectively. For example, such component(s) can be utilized in parallel with on-device component(s) and output from such component(s) utilized when local component(s) fail. For example, on-device fulfillment engine 145 can fail in certain situations (e.g., due to relatively limited resources of client device 160) and remote fulfillment engine 184 can utilize the more robust resources of the cloud to generate fulfillment data in such situations. Remote fulfillment engine 184 can be operated in parallel with on-device fulfillment engine 145 and its results utilized when on-device fulfillment fails, or can be invoked responsive to determining failure of on-device fulfillment engine 145.

In various implementations, an NLU engine (on-device 144 and/or remote 183) can generate annotated output that includes one or more annotations of the recognized text and one or more (e.g., all) of the terms of the natural language input. In some implementations an NLU engine is configured to identify and annotate various types of grammatical information in natural language input. For example, an NLU engine may include a morphological module that may separate individual words into morphemes and/or annotate the morphemes, e.g., with their classes. An NLU engine may also include a part of speech tagger configured to annotate terms with their grammatical roles. Also, for example, in some implementations an NLU engine may additionally and/or alternatively include a dependency parser configured to determine syntactic relationships between terms in natural language input.

In some implementations, an NLU engine may additionally and/or alternatively include an entity tagger configured to annotate entity references in one or more segments such as references to people (including, for instance, literary characters, celebrities, public figures, etc.), organizations, locations (real and imaginary), and so forth. In some implementations, an NLU engine may additionally and/or alternatively include a coreference resolver (not depicted) configured to group, or "cluster," references to the same entity based on one or more contextual cues. In some implementations, one or more components of an NLU engine may rely on annotations from one or more other components of the NLU engine.

An NLU engine may also include an intent matcher that is configured to determine an intent of a user engaged in an interaction with automated assistant 195. An intent matcher can use various techniques to determine an intent of the user.

In some implementations, an intent matcher may have access to one or more local and/or remote data structures that include, for instance, a plurality of mappings between grammars and responsive intents. For example, the grammars included in the mappings can be selected and/or learned over time, and may represent common intents of users. For example, one grammar, "play <artist>", may be mapped to an intent that invokes a responsive action that causes music by the <artist> to be played on the client device 110. Another grammar, "[weather|forecast] today," may be match-able to user queries such as "what's the weather today" and "what's the forecast for today?" In addition to or instead of grammars, in some implementations, an intent matcher can employ one or more trained machine learning models, alone or in combination with one or more grammars. These trained machine learning models can be trained to identify intents, e.g., by embedding recognized text from a spoken utterance into a reduced dimensionality space, and then determining which other embeddings (and therefore, intents) are most proximate, e.g., using techniques such as Euclidean distance, cosine similarity, etc. As seen in the "play <artist>" example grammar above, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Other slot value(s) can be inferred based on, for example, user location, currently rendered content, user preferences, and/or other cue(s).

A fulfillment engine (local 145 and/or remote 184) can be configured to receive the predicted/estimated intent that is output by an NLU engine, as well as any associated slot values and fulfill (or "resolve") the intent. In various implementations, fulfillment (or "resolution") of the user's intent may cause various fulfillment information (also referred to as fulfillment data) to be generated/obtained, e.g., by fulfillment engine. This can include determining local and/or remote responses (e.g., answers) to the spoken utterance, interaction(s) with locally installed application(s) to perform based on the spoken utterance, command(s) to transmit to Internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

Figure 2:
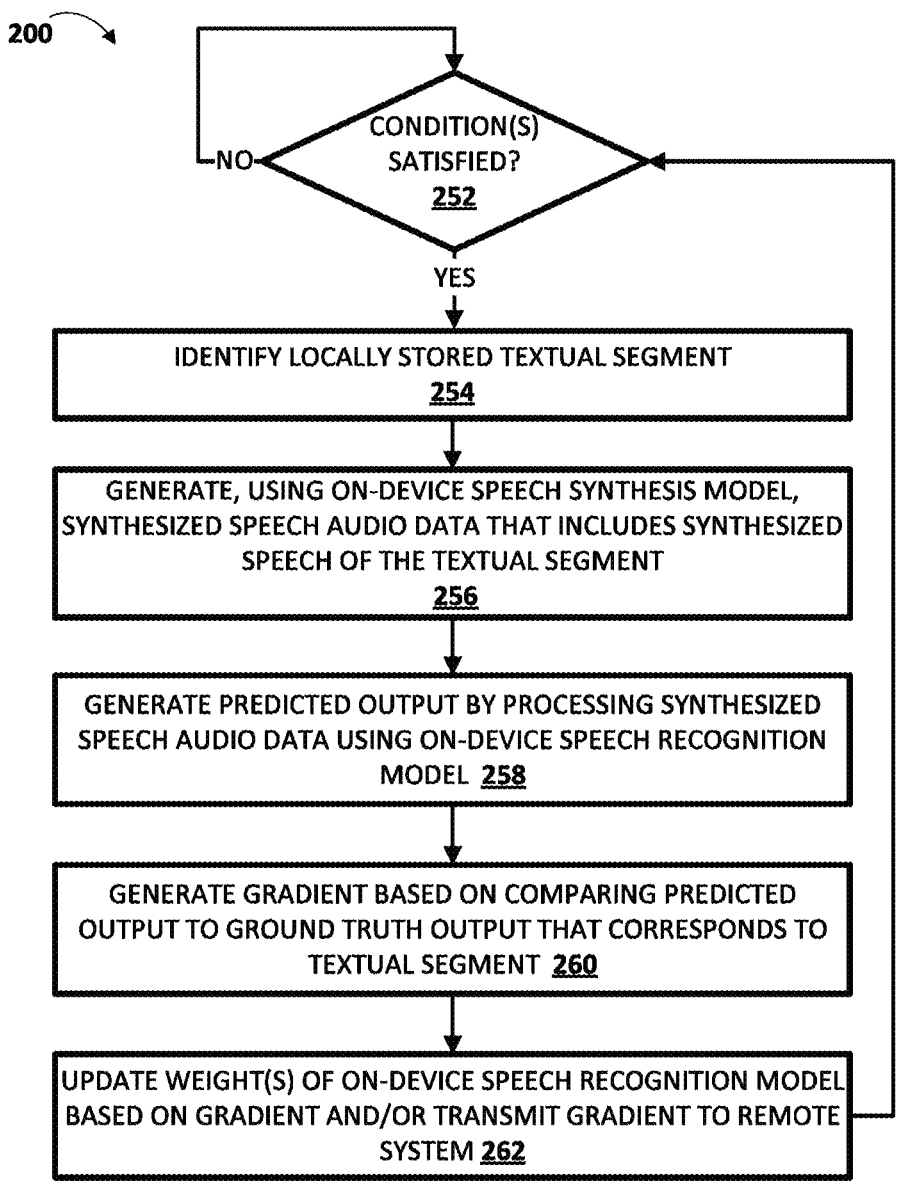
FIG. 2 depicts a flowchart illustrating an example method of generating a gradient, locally at a client device, and transmitting the gradient and/or utilizing the generated gradient to update weight(s) of an on-device speech recognition model.

FIG. 2 depicts a flowchart illustrating an example method 200 of generating a gradient, locally at a client device, and transmitting the gradient and/or utilizing the generated gradient to update weight(s) of an on-device speech recognition model. For convenience, the operations of the method 200 are described with reference to a system that performs the operations. This system of method 200 includes one or more processors and/or other component(s) of a client device. Moreover, while operations of the method 200 are shown in a particular order, this is not meant to be limiting. One or more operations may be reordered, omitted, or added.

At block 252, the system determines whether one or more conditions are satisfied. Although illustrated prior to block 254, it is noted that block 252 can also be performed before each of blocks 256, 258, 260, and/or 262—and/or can instead be performed before only a subset of blocks 256, 258, 260, and/or 262. In some implementations, block 252 includes determining whether a current state of the client device satisfies the one or more conditions. For example, the system can determine the current state of the client device based on sensor data from sensor(s) of the client device, and determine whether that current state of the client device satisfies the condition(s). The condition(s) can include, for example, that the client device is charging, that the client device has at least a threshold state of charge, and/or that the client device is not currently moving and/or has not moved within a threshold amount of time (e.g., based on sensor data from accelerometer(s), magnetometer(s), and/or other sensor(s).

At block 254, the system identifies a locally stored textual segment. At block 256, the system generates, using an on-device speech synthesis model, synthesized speech audio data that includes synthesized speech of the textual segment. For example, the system can process a sequence of phonemes of the textual segment, using the on-device speech synthesis model, to generate the synthesized speech audio data. In some implementations, the system generates synthesized speech audio data based on the textual segment along with one or more additional textual segments appended before or after the textual segment.

At block 258, the system generates a predicted output by processing the synthesized speech audio data using an on-device speech recognition model. In some implementations, the on-device speech recognition model is an end-to-end speech recognition model and the system generates predicted output that is a predicted textual segment. In some other implementations, the on-device speech recognition model is not an end-to-end model, and the system generates a sequence of predicted phonemes and/or another predicted representation.

At block 260, the system generates a gradient based on comparing the predicted output to ground truth output that corresponds to the textual segment. For example, when the system generates predicted output that is a predicted textual segment, the predicted textual segment can be compared with the textual segment in generating the gradient. Also, for example, when the system generates predicted output that is a sequence of predicted phonemes, the sequence of predicted phonemes can be compared with a sequence of phonemes, that corresponds to the textual segment, in generating the gradient. The gradient may represent a difference between the predicted output and the ground truth output in terms of a loss function used to train the speech recognition model or a derivative of that loss function. That is to say, where the speech recognition model is trained to minimize the magnitude of a given loss function, the gradient may be determined by comparison of the ground truth output and the predicted output in terms of that loss function At block 262, the system updates weight(s) of the on-device speech recognition model based on the gradient of block 260 and/or transmits (e.g., via the Internet or other wide area network) the gradient of block 260 to a remote system (without transmitting any of the textual segment, the synthesized speech audio data, and the predicted textual segment). When the gradient is transmitted to the remote system, the remote system utilizes the generated gradient, and additional gradients from additional client devices, to update global weights of a global speech recognition model. After block 262, the system then proceeds back to block 252. Updating the weights of the local or global speech recognition models may comprise applying the gradient(s) through a backpropagation process (e.g. gradient descent backpropagation) to update the weights.

It is noted that, in various implementations, multiple instances of method 200 can be performed on a given client device in parallel. It is also noted that, in some implementations, method 200 can be performed at least responsive to certain events such as an initial configuration of a client device and/or importing of contacts data and/or other data at the client device. For example, method 200 can be performed shortly after and/or during an initial configuration process for the client device and after contacts lists, media playlists, applications, smart device aliases, and/or other information has been imported to the client device. In these and other manners, the on-device speech recognition model can be adapted quickly and personalized to the user that is configuring the client device.

Figure 3:
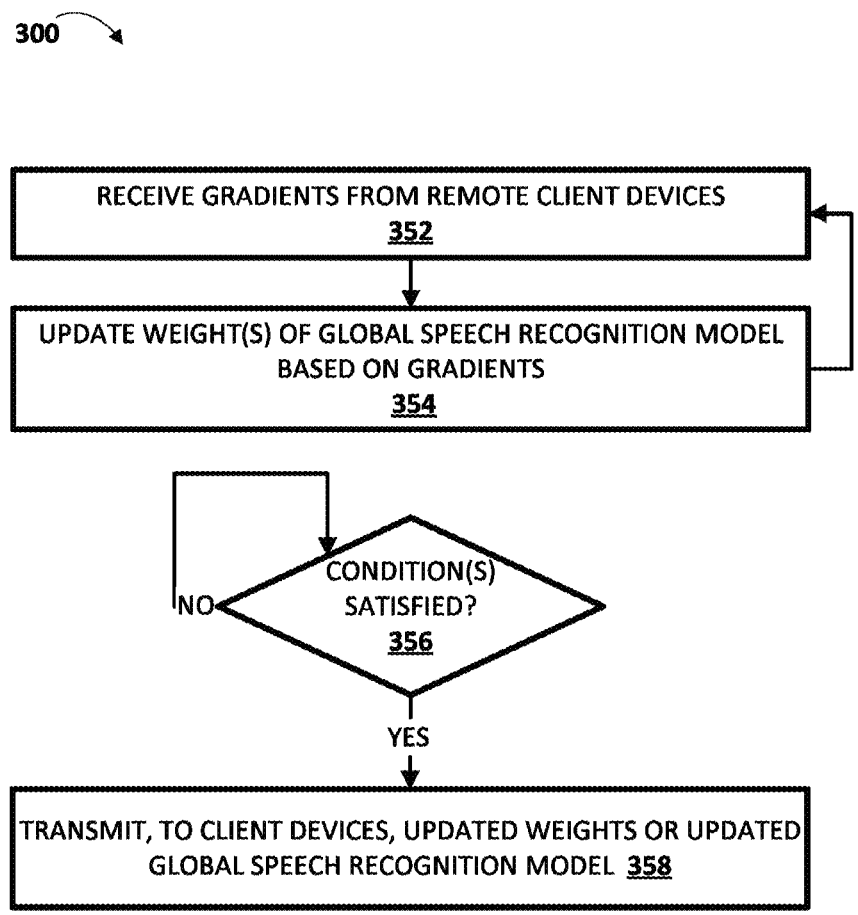
FIG. 3 depicts a flowchart illustrating an example method of updating weight(s) of a global speech recognition model based on gradients received from remote client devices, and transmitting, to remote client devices, the updated weights or the updated global speech recognition model.

FIG. 3 depicts a flowchart illustrating an example method 300 of updating weight(s) of a global speech recognition model based on gradients received from remote client devices, and transmitting, to remote client devices, the updated weights or the updated global speech recognition model. For convenience, the operations of the method 300 are described with reference to a system that performs the operations. This system may include various components of various computer systems, such as one or more server devices. Moreover, while operations of the method 300 are shown in a particular order, this is not meant to be limiting. One or more operations may be reordered, omitted, or added.

At block 352, the system receives gradients from remote client devices. For example, the system can receive gradients from a plurality of client devices that are performing corresponding instances of method 200 of FIG. 2.

At block 354, the system updates weight(s) of a global speech recognition model based on the gradients received at block 352. Iterations of blocks 352 and 354 can continue to be performed as new gradients are received and/or are queued after being received.

At block 356, the system at least periodically determines whether one or more conditions are satisfied, such as one or more of the conditions described herein. Generally, the condition(s) serve as a proxy for determining whether the global model has been updated to an extent that justifies utilization of network resources in transmitting updated weights for the model and/or the updated model itself. In other words, the condition(s) are used as proxy for determining if the performance gains of the model justify the usage of network resources. If so, the system proceeds to block 358 and transmits, to a plurality of client devices, current updated weights and/or a current updated global speech recognition model. The updated weights and/or global speech recognition model can optionally be transmitted to a given client device responsive to a request from the given client device, such as a request during an update procedure and/or a request sent due to the client device being idle and/or charging.

Figure 4:
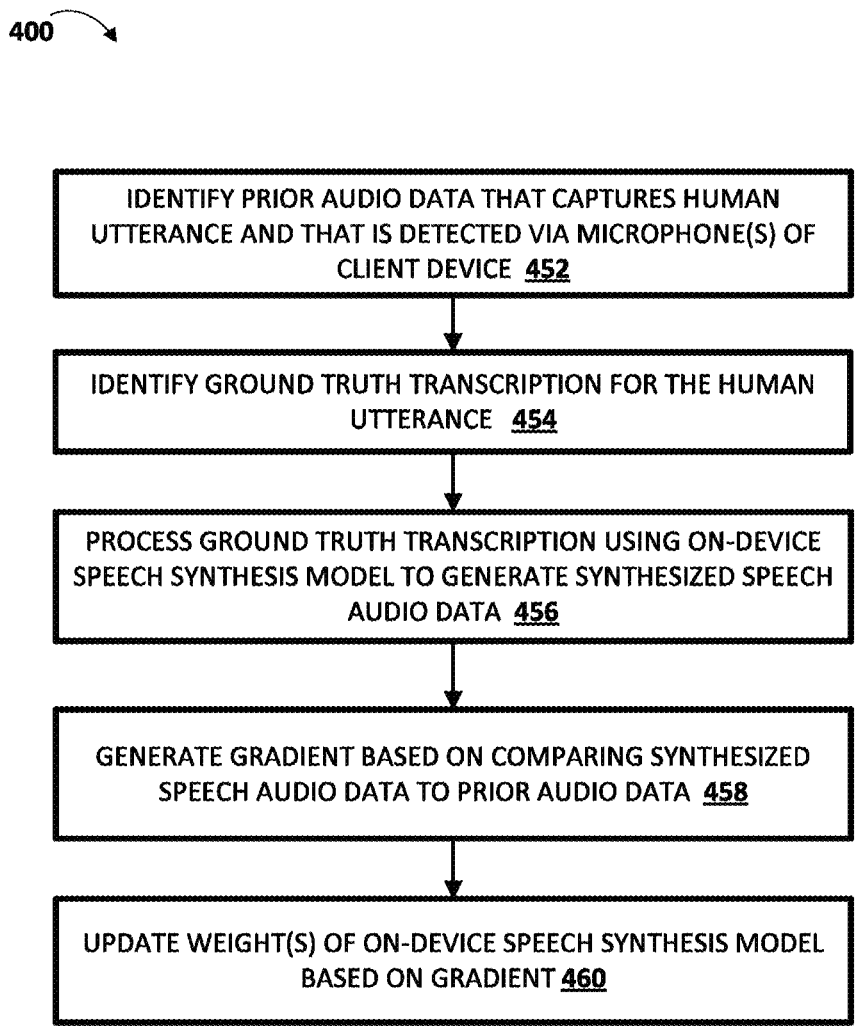
FIG. 4 depicts a flowchart illustrating an example method of generating a gradient, locally at a client device, and using the generated gradient to update weight(s) of an on-device speech synthesis model.

FIG. 4 depicts a flowchart illustrating an example method 400 of generating a gradient, locally at a client device, and using the generated gradient to update weight(s) of an on-device speech synthesis model. For convenience, the operations of the method 400 are described with reference to a system that performs the operations. This system of method 400 includes one or more processors and/or other component(s) of a client device. Moreover, while operations of the method 400 are shown in a particular order, this is not meant to be limiting. One or more operations may be reordered, omitted or added.

At block 452, the system identifies prior audio data that captures a human utterance and that is detected via microphone(s) of a client device.

At block 454, the system identifies a ground truth transcription for the human utterance. For example, the system can process the audio data utilizing an on-device speech recognition model to generate a transcription, and can identify it as "ground truth" if a confidence measure for the transcription satisfies a threshold and/or if user action(s) (or inactions), responsive to a presentation of the transcription, indicate that the transcription is correct. In some implementations, the prior human utterance can be an enrollment phrase spoken by the user for text-independent or speaker-independent identification, and the enrollment phrase can be rendered to the user to inform the user what to speak for the enrollment phrase. In those implementations, the system can utilize the enrollment phrase rendered to the user as the ground truth transcription.

At block 456, the system processes the ground truth transcription using an on-device speech synthesis model to generate synthesized speech audio data.

At block 458, the system generates a gradient based on comparing the synthesized speech audio data to prior audio data.

At block 460, the system updates weight(s) of the on-device speech synthesis model based on the gradient generated at block 458. It is noted that one or more iterations of method 400 can be performed at a given client device prior to performance of one or more iterations of method 200 (FIG. 2) on the given client device. Through performance of the method 400, the on-device speech synthesis model is tailored in view of speech characteristics of a user of the given client device. This can result in synthesized speech, generated in method 200 using the on-device speech synthesis model, that more accurately reflect the user's speech characteristics, which can result in improved training of the on-device speech recognition model utilizing method 200.

Figure 5:
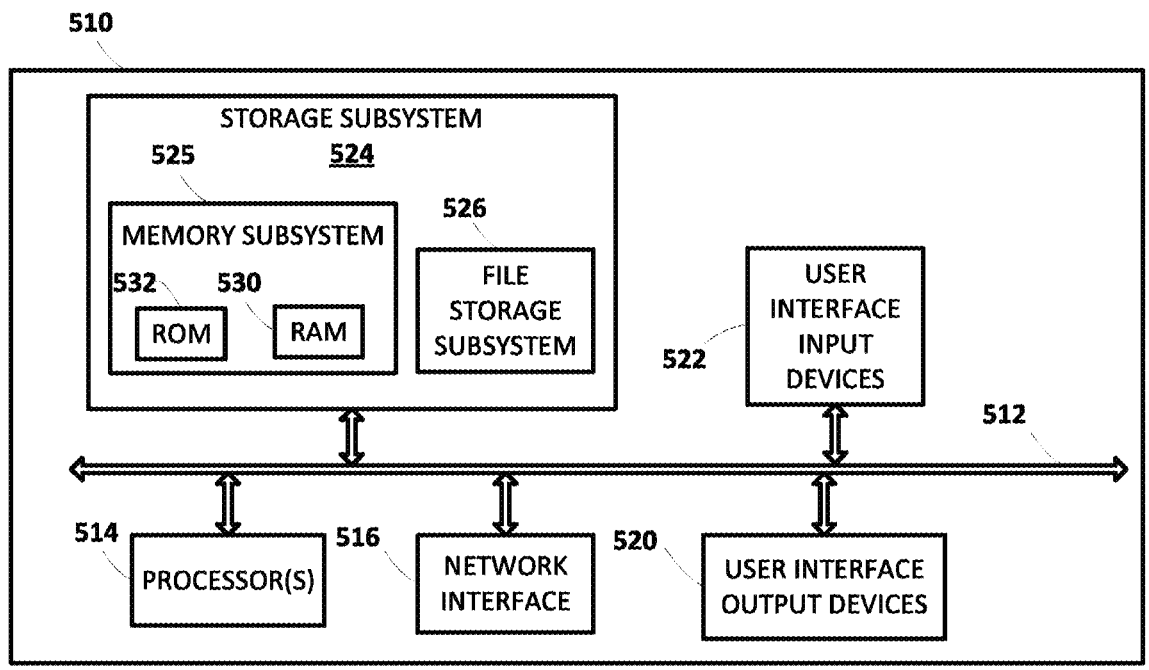
FIG. 5 illustrates an example architecture of a computing device.

FIG. 5 is a block diagram of an example computing device 510 that may optionally be utilized to perform one or more aspects of techniques described herein. In some implementations, one or more of a client device, cloud-based automated assistant component(s), and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods disclosed herein, as well as to implement various components depicted in FIGS. 1A and 1B.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method performed by one or more processors of a client device is provided and includes identifying a textual segment stored locally at the client device. The method further includes generating synthesized speech audio data that includes synthesized speech of the identified textual segment. Generating the synthesized speech audio data includes processing the textual segment using a speech synthesis model stored locally at the client device. The method further includes processing, using an end-to-end speech recognition model stored locally at the client device, the synthesized audio data to generate a predicted textual segment. The method further includes generating a gradient based on comparing the predicted textual segment to the textual segment, and updating one or more weights of the end-to-end speech recognition model based on the generated gradient.

These and other implementations of the technology can include one or more of the following features.

In some implementations, the method further includes transmitting, over a network to a remote system, the generated gradient without transmitting any of: the textual segment, the synthesized speech audio data, and the predicted textual segment. The remote system utilizes the generated gradient, and additional gradients from additional client devices, to update global weights of a global end-to-end speech recognition model. The updated global weights of the global end-to-end speech recognition model can be stored in memory of the remote system. In some versions of those implementations, the method further includes: receiving, at the client device and from the remote system, the global end-to-end speech recognition model; and responsive to receiving the global speech recognition model, replacing, in local storage of the client device, the end-to-end speech recognition model with the global speech recognition model. Receiving the global end-to-end speech recognition model is subsequent to the remote system updating the global weights of the global end-to-end speech recognition model based on the gradient and the additional gradients. In some alternative versions of those implementations, the method further includes: receiving, at the client device and from the remote system, the updated global weights; and responsive to receiving the updated global weights, replacing, in local storage of the client device, weights of the end-to-end speech recognition model with the updated global weights. Receiving the updated global weights is subsequent to the remote system updating the global weights of the global end-to-end speech recognition model based on the gradient and the additional gradients.

In some implementations, the textual segment is identified from a contacts list, a media playlist, a list of aliases of linked smart devices, from typed input received at the client device, and or from optical character recognition processing performed on a screenshot captured at the client device.

In some implementations, the textual segment is identified based on the textual segment being newly added as an alias for a contact or as an alias for a linked smart device.

In some implementations, the method further includes determining, based on sensor data from one or more sensors of the client device, that a current state of the client device satisfies one or more conditions. In those implementations, generating the synthesized speech audio data, and/or processing the synthesized speech audio data to generate the predicted textual segment, and/or generating the gradient, and/or updating the one or more weights are performed responsive to determining that the current state of the client device satisfies the one or more conditions. In some of those implementations, the one or more conditions include that the client device is charging, that the client device has at least a threshold state of charge, and/or that the client device is not being carried by a user.

In some implementations, identifying the textual segment is based on: determining that a prior human utterance, detected via one or more microphones, included the textual segment; and determining that a prior speech recognition of the prior human utterance, performed using the end-to-end speech recognition model, failed to correctly recognize the textual segment. In some of those implementations, determining that the prior speech recognition failed to correctly recognize the textual segment is based on received user input that cancels an action predicted based on the prior speech recognition. In some versions of those implementations, determining that the prior human utterance included the textual segment is based on additional received user input received after the user input that cancels the action predicted based on the prior speech recognition. The additional received user input can include input of the textual segment, or selection of the textual segment from a list of textual segments.

In some implementations, generating the synthesized speech audio data that includes synthesized speech of the identified textual segment includes: determining an additional textual segment. In those implementations, generating the synthesized speech audio data includes processing the textual segment, along with the additional textual segment, using the speech synthesis model. In some of those implementations, determining the additional textual segment is based on a defined relationship of the additional textual segment to a particular corpus from which the textual segment is identified.

In some implementations, processing the textual segment using the speech synthesis model includes processing a sequence of phonemes determined to correspond to the textual segment.

In some implementations, the speech synthesis model is one of a plurality of candidate speech synthesis models for a given language, and is locally stored at the client device based at least in part on a geographic region of the client device.

In some implementations, the method further includes, prior to generating the synthesized speech audio data: identifying prior audio data that is detected via one or more microphones of the client device and that captures a prior human utterance; identifying a ground truth transcription for the prior human utterance; processing the ground truth transcription using the speech synthesis model to generate prior synthesized speech audio data; generating a gradient based on comparing the prior synthesized speech audio data to the prior audio data; and updating one or more weights of the speech synthesis model based on the gradient. In some of those implementations, identifying the ground truth transcription includes generating a transcription using the speech recognition model, and identifying the transcription as the ground truth transcription based on a confidence measure in generating the transcription and/or based on a user action performed responsive to the transcription.

In some implementations, a method performed by one or more processors of a client device is provided and includes identifying a textual segment stored locally at the client device. The method further includes generating synthesized speech audio data that includes synthesized speech of the identified textual segment. Generating the synthesized speech audio data includes processing the textual segment using a speech synthesis model stored locally at the client device. The method further includes processing, using an end-to-end speech recognition model stored locally at the client device, the synthesized audio data to generate a predicted textual segment. The method further includes generating a gradient based on comparing the predicted textual segment to the textual segment. The method further includes transmitting, over a network to a remote system, the generated gradient without transmitting any of: the textual segment, the synthesized speech audio data, and the predicted textual segment. The remote system utilizes the generated gradient, and additional gradients from additional client devices, to update global weights of a global end-to-end speech recognition model.

These and other implementations of the technology can include one or more of the following features.

In some implementations, the updated global weights of the global end-to-end speech recognition model are stored in memory of the remote system.

In some implementations, the method further includes: receiving, at the client device and from the remote system, the global end-to-end speech recognition model; responsive to receiving the global end-to-end speech recognition model, replacing, in local storage of the client device, the speech recognition model with the global end-to-end speech recognition model. Receiving the global end-to-end speech recognition model is subsequent to the remote system updating the global weights of the global end-to-end speech recognition model based on the gradient and the additional gradients In some implementations, the method further includes: receiving, at the client device and from the remote system, the updated global weights; and responsive to receiving the updated global weights, replacing, in local storage of the client device, weights of the speech recognition model with the updated global weights. Receiving the updated global weights is subsequent to the remote system updating the global weights of the global end-to-end speech recognition model based on the gradient and the additional gradients In some implementations, the method further includes: determining, based on sensor data from one or more sensors of the client device, that a current state of the client device satisfies one or more conditions. In some versions of those implementations, receiving updated global weights from the remote system or receiving the global end-to-end speech recognition model from the remote system is responsive to transmitting, by the client device, a request responsive to determining that the current state of the client device satisfies the one or more conditions. In some additional or alternative version of those implementations, generating the synthesized speech audio data, and/or processing the synthesized speech audio data to generate the predicted textual segment, and/or generating the gradient, and/or transmitting the generated gradient are performed responsive to determining that the current state of the client device satisfies the one or more conditions.

In some implementations, generating the synthesized speech audio data that includes synthesized speech of the identified textual segment further includes determining an additional textual segment, and generating the synthesized speech audio data by processing the textual segment, along with the additional textual segment, using the speech synthesis model.

In some implementations, the speech synthesis model is one of a plurality of candidate speech synthesis models for a given language, and is locally stored at the client device based at least in part on a geographic region of the client device.

In some implementations, the method further includes, prior to generating the synthesized speech audio data: identifying prior audio data that is detected via one or more microphones of the client device and that captures a prior human utterance; identifying a ground truth transcription for the prior human utterance; processing the ground truth transcription using the speech synthesis model to generate prior synthesized speech audio data; generating a gradient based on comparing the prior synthesized speech audio data to the prior audio data; and updating one or more weights of the speech synthesis model based on the gradient.

In some implementations, a method performed by one or more processors of a client device is provided and includes identifying a textual segment stored locally at the client device. The method further includes generating synthesized speech audio data that includes synthesized speech of the identified textual segment. Generating the synthesized speech audio data includes processing the textual segment using a speech synthesis model stored locally at the client device. The method further includes processing, using a recognition model stored locally at the client device, the synthesized speech audio data to generate predicted output. The method further includes generating a gradient based on comparing the predicted output to ground truth output that corresponds to the textual segment. The method further includes updating one or more weights of the speech recognition model based on the generated gradient.

These and other implementations of the technology can include one or more of the following features.

In some implementations, the predicted output includes a sequence of predicted phonemes, and the ground truth output includes a ground truth sequence of phonemes that correspond to the textual segment.

In some implementations, the predicted output comprises a predicted textual segment, and the ground truth output includes the textual segment.

What is claimed is:

1. A method of personalizing an end-to-end speech recognition model for a user, the method implemented by one or more processors and the method comprising:
   identifying a textual segment;
   generating synthesized speech audio data that includes synthesized speech of the identified textual segment, wherein generating the synthesized speech audio data comprises processing the textual segment using a speech synthesis model adapted to one or more voice characteristics of the user;
   processing, using the end-to-end speech recognition model, the synthesized speech audio data to generate a predicted textual segment;
   generating a gradient based on comparing the predicted textual segment to the textual segment; and
   updating one or more weights of the end-to-end speech recognition model based on the generated gradient.

2. The method of claim 1, wherein the one or more processors are of a client device and further comprising:
   transmitting, to a remote system, the generated gradient without transmitting any of: the textual segment, the synthesized speech audio data, and the predicted textual segment;
   wherein the remote system utilizes the generated gradient, and additional gradients from additional client devices, to update global weights of a global end-to-end speech recognition model.

3. The method of claim 1, wherein the identified textual segment is a name and wherein identifying the textual segment is based on the name being saved as a contact in a contacts list.

4. The method of claim 1, wherein the identified textual segment is a name of a media item and wherein identifying the textual segment includes identifying the textual segment from a media playlist.

5. The method of claim 1, wherein identifying the textual segment is based on determining that the textual segment is new.

6. The method of claim 1, wherein the one or more processors are of a client device and further comprising:
- determining, based on sensor data from one or more sensors of the client device, that a current state of the client device satisfies one or more conditions;
- wherein generating the synthesized speech audio data, processing the synthesized speech audio data to generate the predicted textual segment, generating the gradient, and/or updating the one or more weights are performed responsive to determining that the current state of the client device satisfies the one or more conditions.

7. The method of claim 6, wherein the one or more conditions include at least one of: the client device is charging, the client device has at least a threshold state of charge, or the client device is not being carried.

8. The method of claim 6, wherein the one or more conditions include that the client device has at least a threshold state of charge and the client device is not being carried.

9. The method of claim 1, wherein the speech synthesis model is adapted to the one or more voice characteristics of the user based on prior audio data that captures a prior utterance of the user, the prior utterance of the user being provided prior to generating the synthesized speech audio.

10. A system used in personalizing an end-to-end speech recognition model for a user, the system comprising:
- memory storing instructions;
- one or more processors operable to execute the instructions to:
  - identify a textual segment;
  - generate synthesized speech audio data that includes synthesized speech of the identified textual segment, wherein in generating the synthesized speech audio data one or more of the processors are to process the textual segment using a speech synthesis model adapted to one or more voice characteristics of the user;
  - process, using the end-to-end speech recognition model, the synthesized speech audio data to generate a predicted textual segment;
  - generate a gradient based on comparing the predicted textual segment to the textual segment; and
  - update one or more weights of the end-to-end speech recognition model based on the generated gradient.

11. The system of claim 10, wherein the one or more processors are of a client device and wherein one or more of the processors are further operable to:
- transmit, to a remote system, the generated gradient without transmitting any of: the textual segment, the synthesized speech audio data, and the predicted textual segment;
- wherein the remote system utilizes the generated gradient, and additional gradients from additional client devices, to update global weights of a global end-to-end speech recognition model.

12. The system of claim 10, wherein the identified textual segment is a name and wherein in identifying the textual segment one or more of the processors are to identify the textual segment based on the name being saved as a contact in a contacts list.

13. The system of claim 10, wherein the identified textual segment is a name of a media item and wherein in identifying the textual segment one or more of the processors are to identify the textual segment from a media playlist.

14. The system of claim 10, wherein in identifying the textual segment one or more of the processors are to identify the textual segment based on determining that the textual segment is new.

15. The system of claim 10, wherein the one or more processors are of a client device and wherein one or more of the processors are further operable to:
- determine, based on sensor data from one or more sensors of the client device, that a current state of the client device satisfies one or more conditions;
- wherein generating the synthesized speech audio data, processing the synthesized speech audio data to generate the predicted textual segment, generating the gradient, and/or updating the one or more weights are performed responsive to determining that the current state of the client device satisfies the one or more conditions.

16. The system of claim 15, wherein the one or more conditions include at least one of: the client device is charging, the client device has at least a threshold state of charge, or the client device is not being carried.

17. The system of claim 15, wherein the one or more conditions include that the client device has at least a threshold state of charge and the client device is not being carried.

18. The system of claim 10, wherein the speech synthesis model is adapted to the one or more voice characteristics of the user based on prior audio data that captures a prior utterance of the user, the prior utterance of the user being provided prior to generating the synthesized speech audio.

19. One or more non-transitory computer readable storage media storing computer instructions that are executable by one or more processors to personalize an end-to-end speech recognition model for a user by:
- identifying a textual segment;
- generating synthesized speech audio data that includes synthesized speech of the identified textual segment, wherein generating the synthesized speech audio data comprises processing the textual segment using a speech synthesis model adapted to one or more voice characteristics of the user;
- processing, using the end-to-end speech recognition model, the synthesized speech audio data to generate a predicted textual segment;
- generating a gradient based on comparing the predicted textual segment to the textual segment; and
- updating one or more weights of the end-to-end speech recognition model based on the generated gradient.

* * * * *